(12) United States Patent
Li et al.

(10) Patent No.: US 11,150,364 B2
(45) Date of Patent: Oct. 19, 2021

(54) CRYSTAL ARRAY, DETECTOR, MEDICAL DETECTION DEVICE AND METHOD OF MANUFACTURING CRYSTAL ARRAY

(71) Applicant: Shanghai Neusoft Medical Technology Co., Ltd., Shanghai (CN)

(72) Inventors: Xinying Li, Shanghai (CN); Xi Wang, Shanghai (CN); Jian Zhao, Shanghai (CN); Baowei Xu, Shanghai (CN); Guodong Liang, Shanghai (CN)

(73) Assignee: Shanghai Neusoft Medical Technology Co., Ltd., Shanghai (CN)

( * ) Notice: Subject to any disclaimer, the term of this patent is extended or adjusted under 35 U.S.C. 154(b) by 0 days.

(21) Appl. No.: 16/859,723

(22) Filed: Apr. 27, 2020

(65) Prior Publication Data

US 2020/0341158 A1 Oct. 29, 2020

(30) Foreign Application Priority Data

Apr. 28, 2019 (CN) .......................... 201910349456.1

(51) Int. Cl.
  *G01T 1/164* (2006.01)
  *G01T 1/29* (2006.01)
  *G01T 1/20* (2006.01)
  *G01T 1/202* (2006.01)

(52) U.S. Cl.
  CPC .......... *G01T 1/2985* (2013.01); *G01T 1/1641* (2013.01); *G01T 1/2002* (2013.01); *G01T 1/202* (2013.01)

(58) Field of Classification Search
  CPC ... G01T 1/2985; G01T 1/1641; G01T 1/2002; G01T 1/202; G01T 1/2023; A61B 6/037
  See application file for complete search history.

(56) References Cited

U.S. PATENT DOCUMENTS

| | | | | |
|---|---|---|---|---|
| 5,091,650 | A * | 2/1992 | Uchida | G01T 1/202 250/363.03 |
| 9,279,892 | B2 * | 3/2016 | Kim | G01T 1/202 |
| 2009/0020706 | A1* | 1/2009 | Sekiguchi | G01T 1/202 250/370.11 |
| 2011/0114847 | A1* | 5/2011 | Fujieda | C09D 7/68 250/370.09 |
| 2013/0020488 | A1* | 1/2013 | Flamanc | G01T 1/20 250/362 |
| 2016/0223686 | A1* | 8/2016 | Uchida | G01T 1/2008 |
| 2019/0353807 | A1* | 11/2019 | Furenlid | G01T 1/2985 |

FOREIGN PATENT DOCUMENTS

| | | |
|---|---|---|
| CN | 103518145 A | 1/2014 |
| CN | 106646581 A | 5/2017 |

* cited by examiner

*Primary Examiner* — Kiho Kim
(74) *Attorney, Agent, or Firm* — Fish & Richardson P.C.

(57) ABSTRACT

A crystal array, a detector, a medical detection device and a method for manufacturing a crystal array are provided. The crystal array includes a plurality of crystals arranged in an array, each of the crystals having a light incident surface, a light exit surface, and a connection surface connecting the light incident surface to the light exit surface, where the connection surface of at least one of two adjacent crystals includes a rough surface and a smooth surface connected to the rough surface, and the rough surface and the smooth surface are arranged along a length direction of the crystal.

20 Claims, 6 Drawing Sheets

CRYSTAL ARRAY, DETECTOR, MEDICAL DETECTION DEVICE AND METHOD OF MANUFACTURING CRYSTAL ARRAY

CROSS REFERENCE TO RELATED APPLICATIONS

This application claims priority to Chinese Patent Application No. 201910349456.1 entitled "CRYSTAL ARRAY, DETECTOR, MEDICAL DETECTION DEVICE AND METHOD OF MANUFACTURING CRYSTAL ARRAY" filed on Apr. 28, 2019, the disclosure of which is incorporated herein by reference in its entirety.

BACKGROUND

A medical detection device, for example, a Positron Emission Tomography (PET) system for observing metabolic processes in a body, uses the principle that by injecting drugs labelled with isotopes having positron emission into a human body, such as one or two types isotopes of carbon, fluorine, oxygen and nitrogen, and when participating in physiological metabolism of the human body, these drugs will have an annihilation effect which generates two γ rays emitted back-to-back with an energy of 0.511 MeV. The gamma rays interact in a scintillator to emit a large number of photons which are detected by a back-end photodetector. The more photons are detected, the better the performance of the detector.

In order to accurately locate the incident position of the γ ray, in existing PET systems, elongated crystals are generally used and a plurality of small pixel crystals are arranged to an array. As the main detection material, the larger the effective detection area formed by the crystal, the higher the detection efficiency of the detector. The thinner the thickness of the reflective film, it is more beneficial to increase the effective detection area of the detector. However, a too-thin reflective film will result in reduced reflection effect and increased photon crosstalk between the crystals.

SUMMARY

The present disclosure provides a crystal array with an increased effective detection area, a detector, a medical detection device, and a method for manufacturing the crystal array.

In one aspect, the present disclosure provides a crystal array for a detector of a medical detection device, the crystal array comprising a plurality of crystals arranged in an array, each of the crystals having a light incident surface, a light exit surface, and a connection surface connecting the light incident surface and the light exit surface, wherein the connection surface of at least one of two adjacent crystals comprises a rough surface and a smooth surface connected to the rough surface, and the rough surface and the smooth surface are arranged along a length direction of the crystals.

In an example, the two adjacent crystals are coupled through air.

In an example, the smooth surface is connected to the light incident surface, and the rough surface is connected to the light exit surface.

In an example, the rough surface area has an area smaller than that of the smooth surface.

In an example, the light incident surface and the light exit surface are smooth surfaces, and are disposed in parallel to each other along a direction perpendicular to the length direction.

In an example, a material of the crystals is at least one of LYSO, LSO, BGO, NaI, LaBr3, GSO, LGSO or GACC.

In an example, the crystal array further comprises a reflective film, wherein the reflective film at least partially covers a periphery of the array formed by the crystals, and a material of the reflective film is at least one of PTFE, Teflon, MgO, TiO2, BaSo4 or ESR.

In another aspect, the present disclosure provides a detector comprising a photodetector assembly and the crystal array described above, wherein the photodetector assembly comprises photodetectors arranged in an array and facing the respective light exit surfaces of the crystals.

In an example, the photodetector comprises at least one of a silicon photomultiplier or a photomultiplier tube.

In still other aspect, the present disclosure provides a medical detection device comprising the detector described above.

In still other aspect, the present disclosure provides a method for manufacturing a crystal array, the crystal array comprising a plurality of crystals, the method comprising processing outer surfaces of each of the plurality of crystals to form a light incident surface, a light exit surface, and a connection surface connecting the light incident surface and the light exit surface; arranging the crystals to form a crystal array; and disposing a reflective film on a periphery of the crystal array and the light incident surface; wherein the connection surface of at least one of two adjacent crystals comprises a rough surface and a smooth surface connected to the rough surface, and the rough surface and the smooth surface are arranged along a length direction of the crystal.

In the present disclosure, the rough surface of the crystal can ensure that there is air between the adjacent crystals, so that the two crystals are coupled through air to increase the detection area of the crystal array, and ensures a distance from the smooth surface of the crystal to that of the adjacent crystal. By different crystal surface treatments, the photon transmission path is improved, so that the crystals are easy to be distinguished in the position map, effectively reducing a ratio of error in position counting.

DETAILED DESCRIPTION

Exemplary embodiments will be described in detail herein, and examples of which are shown in the accompanying drawings. When the following description refers to the accompanying drawings, unless otherwise indicated, the same numeral in different drawings represents the same or similar element. The embodiments described in the following exemplary embodiments do not represent all embodiments consistent with the present disclosure. On the contrary, they are merely examples of devices consistent with some aspects of the present disclosure as detailed in the appended claims.

The terms used in the present disclosure are only for the purpose of describing particular embodiments, and is not intended to limit the present disclosure. Unless otherwise determined, the technical or scientific terms used in the present disclosure should have common meanings understood by those in the art with ordinary skills. "First", "second" and similar terms used in the description and claims of the present disclosure do not indicate any order, quantity or importance, but are only used to distinguish different components. Similarly, "one", "a", "an" and similar terms do not indicate a limit on quantity, but denote at least one of a particular element. "a plurality of" or "several" means two or more. Similar terms such as "include" or "including" mean that elements or objects before "include" or "including" cover elements or objects after "include" or "including" and their equivalents, and do not exclude other elements or objects. "Connected" or "connecting" and similar terms are not limited to physical or mechanical connections, and may include electrical connections, regardless of whether direct or indirect connections. The singular "a", "the" used in the description of the present disclosure and the appended claims are also intended to include plural forms unless the context clearly indicates other meanings. It should also be understood that the term "and/or" as used herein refers to and includes any or all possible combinations of one or more associated items listed.

Referring to FIGS. 1-4, a crystal array, used for a detector of a medical detection device is shown. The crystal array includes a plurality of crystals arranged in an array and each of the crystals has a light incident surface, a light exit surface, and a connection surface connecting the light incident surface and the light exit surface. The connection surface of at least one of two adjacent crystals includes a rough surface and a smooth surface connected to the rough surface, and the rough surface and the smooth surface are arranged along a length direction of the crystal.

Figure 1:
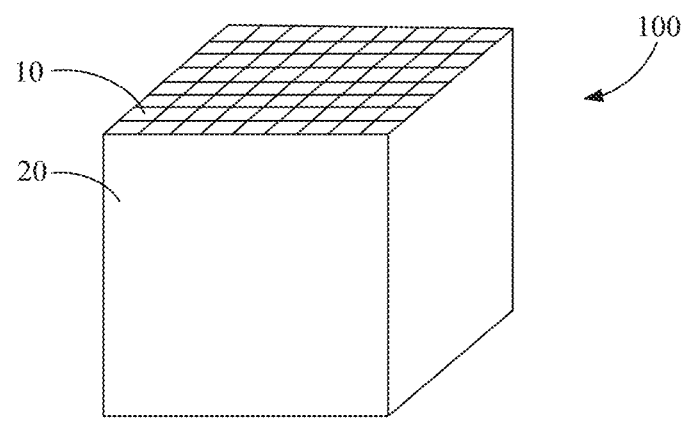
FIG. 1 is a schematic perspective view of a crystal array of an embodiment of the present disclosure.
Figure 2:
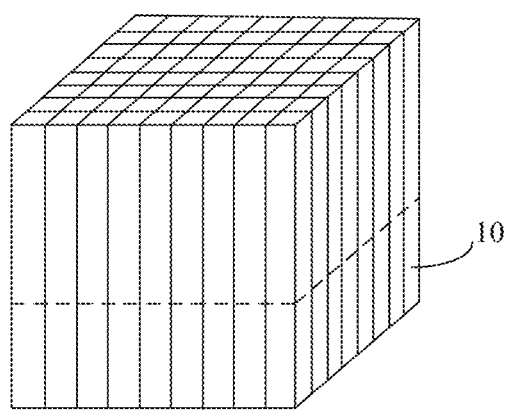
FIG. 2 is a schematic perspective view of internal arrangement of the crystal array shown in FIG. 1.

Specifically, referring to FIGS. 1 and 2, the crystal array 100 includes crystals 10 and reflective films 20. The crystals 10 are arranged in an array. The reflective films 20 at least partially covers a periphery of the array formed by the crystals 10, the periphery is an outer contour along the circumference. In order to ensure detection efficiency and positioning accuracy of Y-ray, elongated crystals are mostly used, and a plurality of elongated crystals are arranged and assembled into an array.

Optionally, a material of the crystal 10 is at least one of LYSO, LSO, BGO, NaI (Tl), LaBr3, GSO, LGSO, or GACC, and a material of the reflective film is at least one of PTFE, Teflon, MgO, TiO2, BaSo4 or ESR.

A length of the crystal can be a function of blocking capability of a scintillation material. For example, when LYSO scintillation materials for PET are used, crystals with a length of 10-25 mm can be used; when LaBr3 scintillation materials are used, crystals with a length of 20-35 mm can be used. In another example, when BGO scintillation materials are used, crystals with a length of 5-20 mm can be used. It is understood that the foregoing example length of the crystal are illustrative in nature, and are intended to illustrate that with an increase in the blocking capability of the scintillator, the length of the crystal can be reduced.

Figure 3:
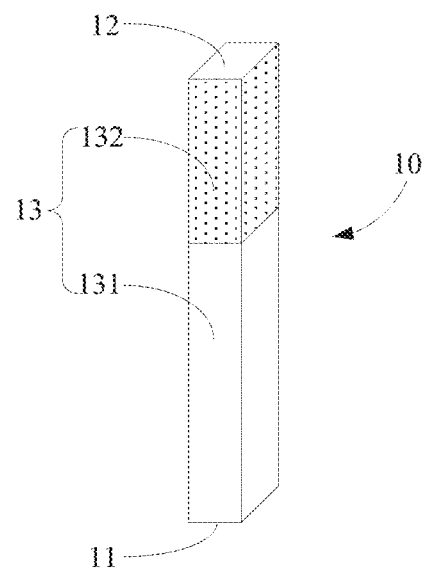
FIG. 3 is a schematic perspective view of a crystal in the crystal array shown in FIG. 1.

Referring to FIG. 3, a crystal 10 includes a light incident surface 11, a light exit surface 12 and a connection surface 13 which connects the light incident surface 11 and the light exit surface 12. The connection surface 13 is an outer contour surface along the circumference of the crystal 10. The Y-ray enters into the crystal 10 via light incident surface 11 and interacts with the crystal 10 to generate a large number of photons, which are emitted via the light exit surface 12 and detected by a photodetector. The more photons are detected, it is more beneficial to improve performance of the detector.

In this embodiment, each of the crystals 10 has the same structure. The connection surface 13 includes a smooth surface 131 and a rough surface 132 connected to the smooth surface. The smooth surface 131 and the rough surface 132 are arranged along the length direction of the crystal 10. The light incident surface 11 and the light exit surface 12 are disposed in parallel to each other in a direction perpendicular to the length direction, and the length direction is perpendicular to the circumferential direction. The smooth surface 131 is connected to the light incident surface 11, and the rough surface 132 is connected to the light exit surface 12. In this embodiment, both the light incident surface 11 and the light exit surface 12 are smooth surfaces.

In this embodiment, two adjacent crystals 10 are coupled by air, in which an air coupling means that no material is added between two to-be-coupled components, that is, the two components are only disposed opposite to each other. In other embodiment, a reflective film with a very small thickness may be disposed between the adjacent crystals to further improve transmission performance of photon.

In this embodiment, since no reflective film is disposed between the two adjacent crystals 10, the distance between the two adjacent crystals 10 can be reduced, thereby expanding the detection area. On the other hand, by performing two types of surface treatments (i.e, smoothing and roughing) on the connection surfaces of the crystals, the photon transmission paths are changed, thereby reducing the differences in transmission of photons at different locations within the crystals, and the rough surface ensures a certain distance between the adjacent crystals 10, which makes the crystal strips to be easily distinguished and the location graph to be more accurately segmented, thereby effectively reducing a probability of error in location counting.

Optionally, the smooth surface 131 may be formed by polishing, and the rough surface 132 may be formed by sanding. In other embodiments, the smooth surface 131 and the rough surface 132 can also be formed by other processes. The rough surface 132 has an area smaller than that of the smooth surface 131. The specific area is determined depending on a position of tailing in the position map in the case of an entirely rough surface, and is related to a size of the crystal and an action depth. By adjusting the area of the rough surface, the tailing phenomenon in the map can be reduced, thereby further makes the adjacent crystals in the position map to be more easily distinguished.

Figure 4:
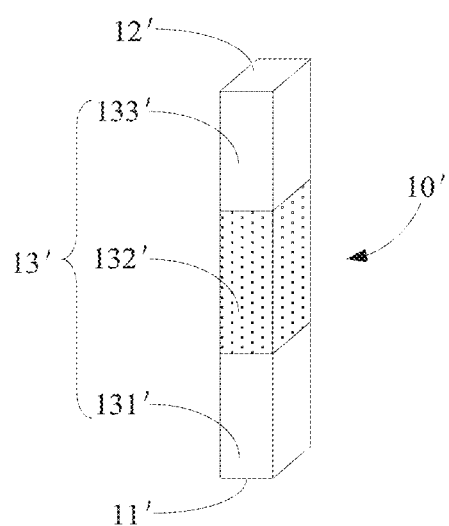
FIG. 4 is a schematic perspective view of a crystal of the crystal array of another embodiment of the present disclosure.

Referring to FIG. 4, in another embodiment, the connection surface 13' of the crystals 10' includes a first smooth surface 131', a second smooth surface 133' and a second rough surface 132 ' connecting the first smooth surface 131' and the second smooth surface 133'. The first smooth surface 131' is connected to the light incident surface 11', and the second smooth surface 133 'is connected to the light exit surface 12'.

In other embodiments, it can also be ensured that the connection surface of at least one of two adjacent crystals includes a smooth surface and a rough surface, that is, not every crystal has an identical structure. It can be understood that as long as one of the two crystals has a rough surface, it can be ensured that only a small part (the convex portion of the rough surface) of the connection surfaces of the two crystals are in contact with each other, that is, there is air between the connection surfaces of the two crystals, thereby allowing air coupling between the two crystals.

Figure 5:
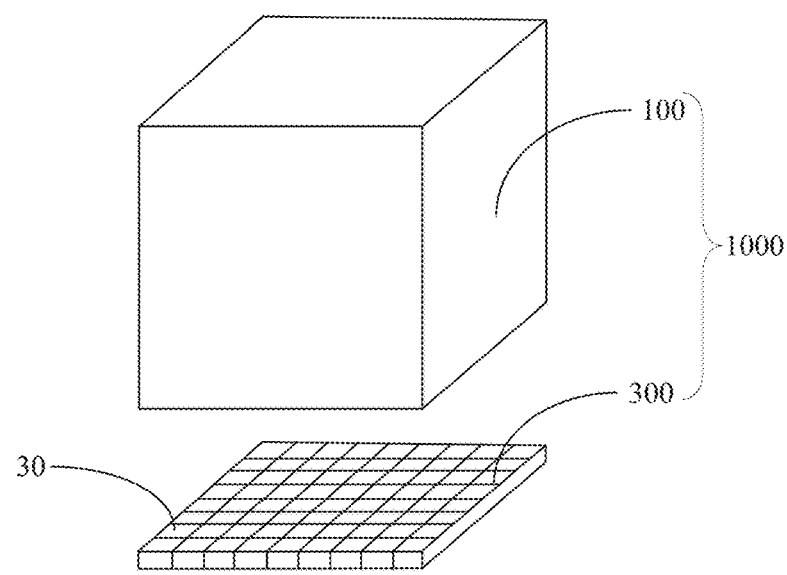
FIG. 5 is a schematic perspective view of a detector of an embodiment of the present disclosure.

Referring to FIG. 5, the present disclosure further provides a detector used for medical detection device. In this embodiment, the detector 1000 includes a photodetector assembly 300 and the crystal array 100 described in any one of the foregoing embodiments. The photodetector assembly 300 includes photodetectors 30 arranged in an array, and each of the photodetectors 30 corresponds to one of the crystals 10 in the crystal array 100 and faces the light exit surface 12 of the crystal 10. The photodetector 30 includes at least one of a silicon photomultiplier (SiPM) or a photo-multiplier tube (PMT) for converting received photons into electrical signals. In other embodiment, each of the photodetectors 30 may face multiple crystals 10.

Figure 6:
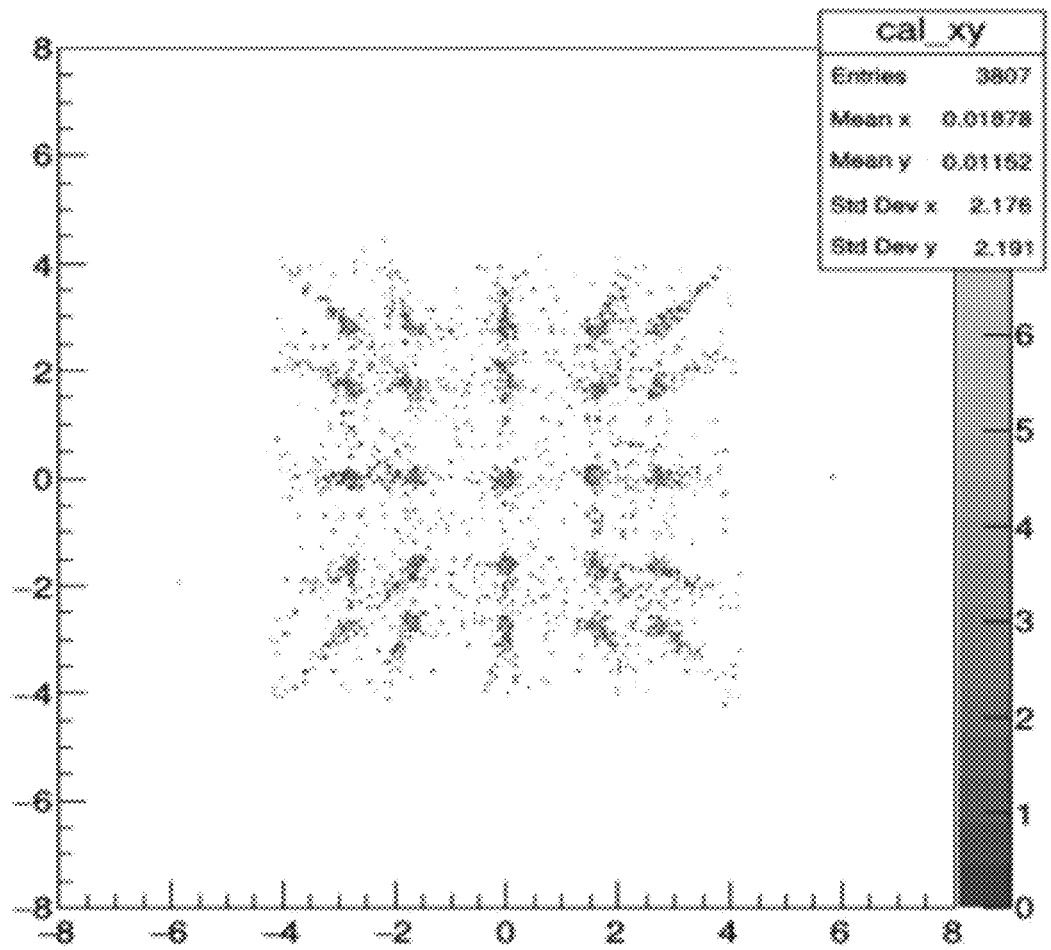
FIGS. 6 to 8 are schematic diagrams of simulation results of the detector.
Figure 7:
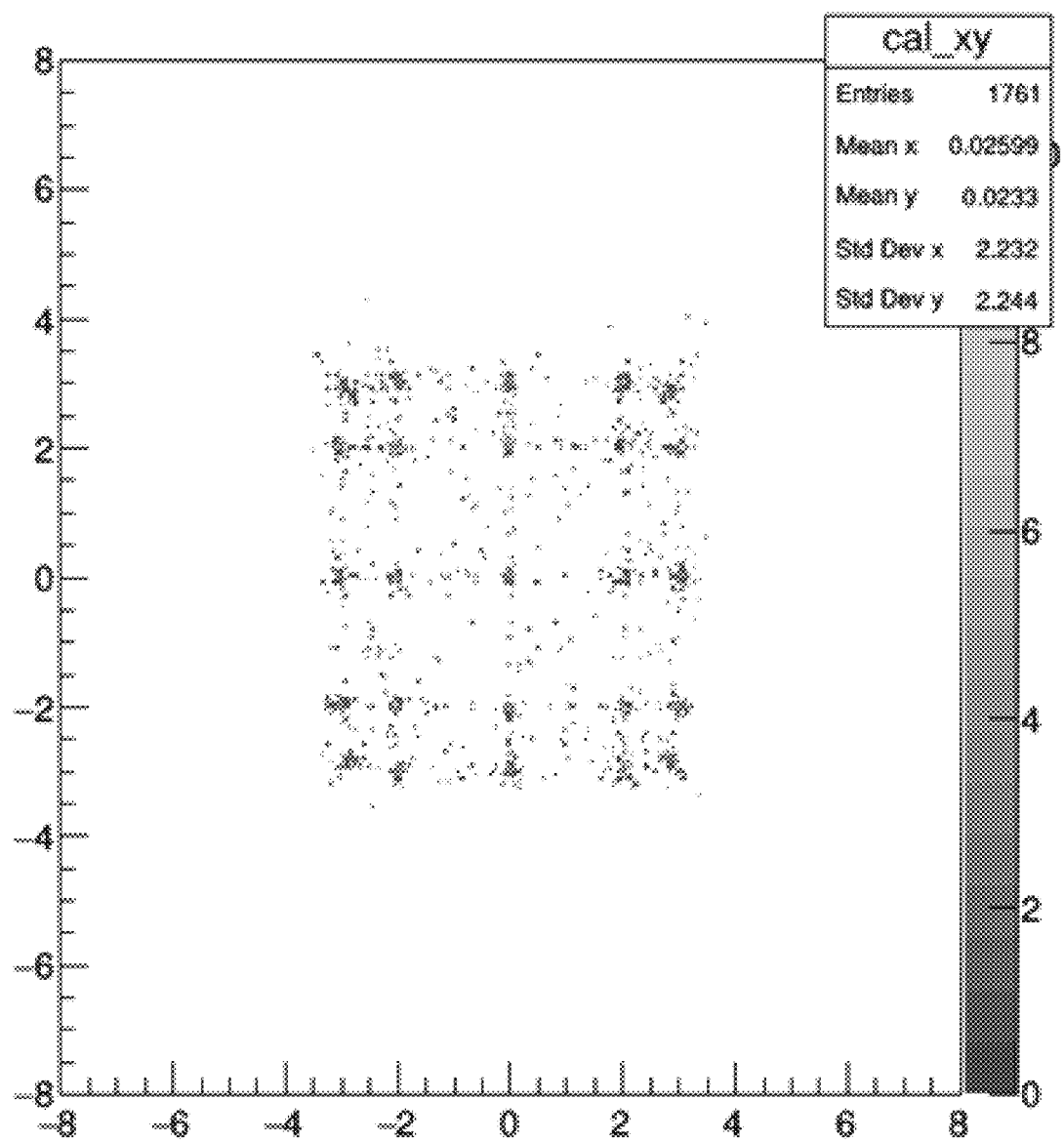
Figure 8:
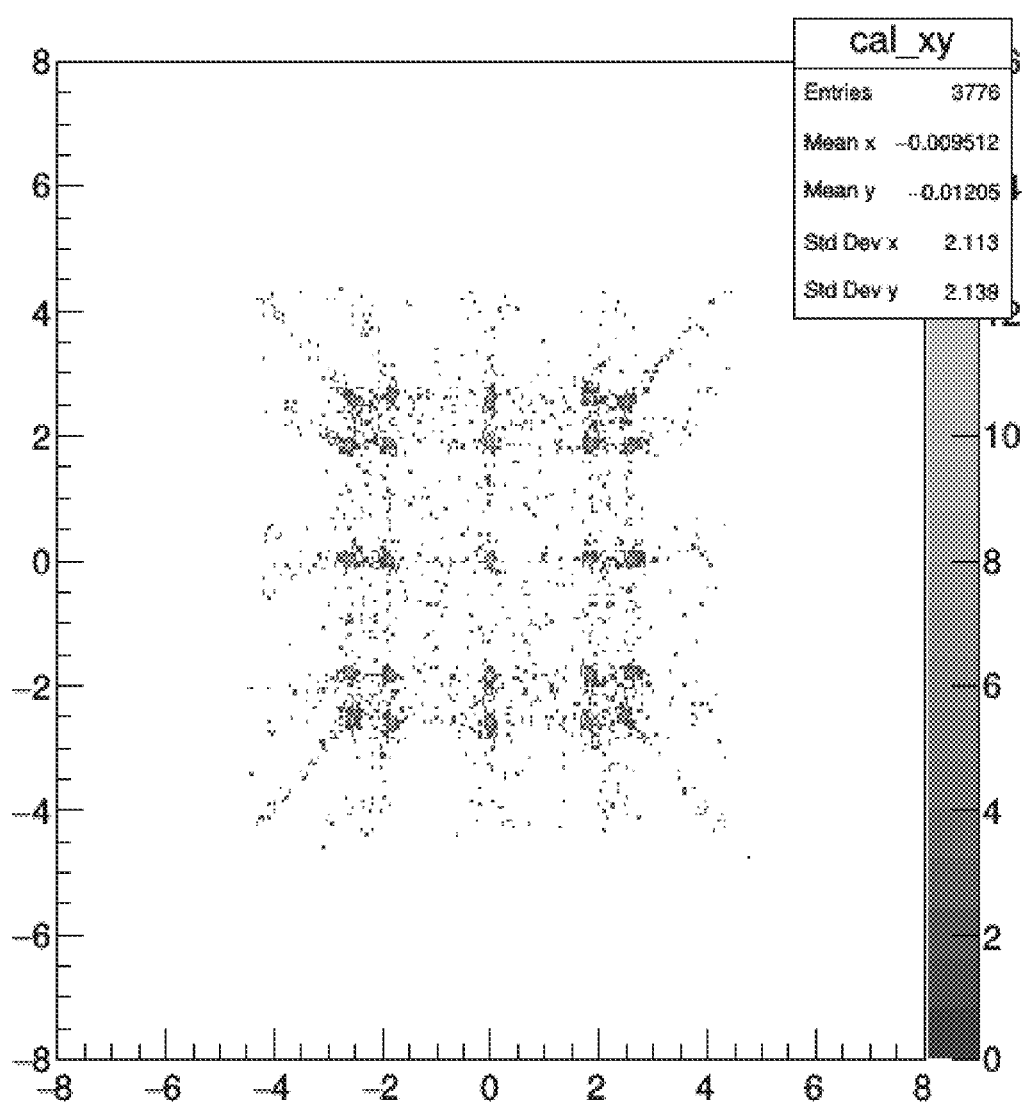

Taking a 5*5 crystal array composed of 3.2 mm*3.2 mm*18 mm LYSO crystals as an example, the crystal array is simulated with a 4*4 SiPM array, in which each SiPM has a size of 3.88 mm*3.88 mm and the reflective film 20 has reflectivity of 98%. Referring to FIG. 6, in a case that the connection surface of the crystal is a rough surface, such as a matte surface, since lights transmit differently at different action depths among different crystals, it's very obvious that positions of crystals near the outer contour surface stretch and expand outward in the position map, which makes the map difficult to be segmented and increases the ratio of error in position counting. Referring to FIG. 7, in a case that the connection surface of the crystal is a smooth surface, such as a polished surface, the difference in light transmission of photons at different action depths among different crystals is weakened in the position map, which makes the map easy to be segmented. However, in actual operations, since the smooth surfaces of the two crystals are very easy to get a close contact, it is difficult to ensure an existence of an air layer thus the air coupling cannot be achieved, so that the total reflection of photons cannot occur on the connection surfaces of the crystals, which makes adjacent position points difficult to be distinguished. Referring to FIG. 8, in a case that the connection surface of the crystal is composed of a smooth surface and a rough surface arranged along the length direction, and the light incident surface and the light exit surface are smooth surfaces, position points of the position map slightly expand outwards, which not only ensures the air gap between the crystals, but also retains advantages of a smooth surface and significantly weakened the difference in transmission of photons at different action depths. When no reflective layer is arranged between the crystals, light collection is improved by 34.3% compared with when a reflective layer is arranged.

Figure 9:
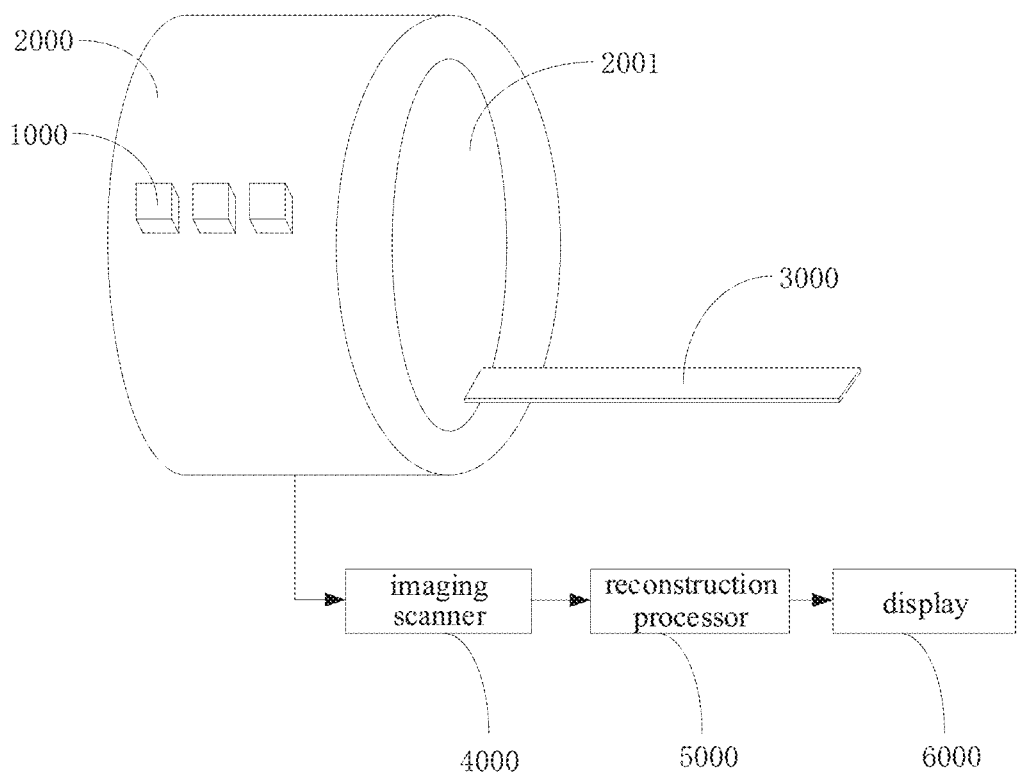
FIG. 9 is a schematic perspective view of a medical detection system of an embodiment of the present disclosure.

Referring to FIG. 9, the present disclosure further provides a medical detection device, including the detector 1000 according to anyone of the foregoing embodiments. The medical detection device further includes a detector ring 2000, a scanning bed 3000, an imaging scanner 4000, and a reconstruction processor 5000 and a display 6000. The detector 1000 is disposed on the periphery of the detector ring 2000. A detection area 2001 is formed inside the detector ring 2000. The scanning bed 3000 can slide relative to the detection area 2001. The driving structure of the scanning bed 3000 is not shown. The imaging scanner 4000 is electrically connected to the detector 1000 and the reconstruction processor 5000 respectively. Electrical signals formed from photons received by the photodetector 30 in the detector 1000 are processed and imaged by the imaging scanner 4000. The reconstruction processor 5000 reconstructs the image, and displays the reconstructed image through the display 6000.

Figure 10:
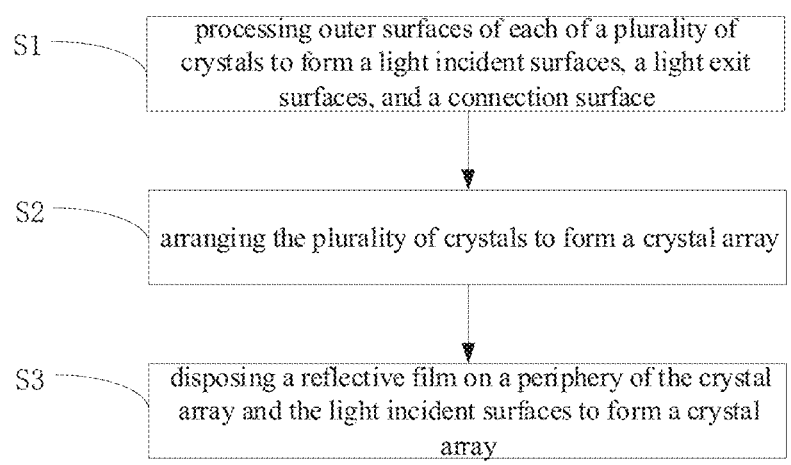
FIG. 10 is a schematic flow chart of a method for manufacturing a crystal array of an embodiment of the present disclosure.

In addition, the present disclosure further provides a method for manufacturing a crystal array, which is used for manufacturing the crystal array 100 according to anyone of the foregoing embodiments. Referring to FIG. 10, the method for manufacturing the crystal array includes:

Step S1: processing outer surfaces of each of a plurality of crystals to form a light incident surfaces, a light exit surfaces, and a connection surface connecting the light incident surface and the light exit surface;

Step S2: arranging the plurality of crystals to form a crystal array;

wherein, the connection surface 13 of at least one of two adjacent crystals 10 includes a rough surface 132 and a smooth surface 131 connected to the rough surface 132, the rough surface 132 and the smooth surface 131 are arranged along a length direction of the crystal 10. Other structures of the crystal 10 are as described in the foregoing embodiment, and will not be detailed here.

Optionally, the convex parts of the rough surfaces 132 of the adjacent crystals are brought into contact to ensure that other parts of the adjacent crystals are not in contact with each other and are coupled through air.

Step S3: disposing a reflective film on a periphery of the crystal array and the light incident surfaces to form a crystal array;

wherein, the periphery of the array is an outward contour surface along the circumferential direction of the array, and the circumferential direction is perpendicular to the length direction of the crystals.

In one example, to manufacture the above detector 1000, the crystal array 100 and the photodetector assembly 300 are coupled, for example, by glue coupling or air coupling.

In the present disclosure, the rough surface of the crystal can ensure that there is air between the adjacent crystals, so that the two crystals are coupled through air, which increases the detection area of the crystal array and improves a transmission path of photons in the crystals to cause the crystals to be easily distinguished in the position map, effectively reducing the ratio of error in position counting.

The foregoing embodiments are only some embodiments of the present disclosure and are not intended to limit the present disclosure. Therefore, any alteration, equivalent replacement or modification made within the spirit and principle of the present disclosure should fall in the scope of the present disclosure.

What is claimed is:

1. A crystal array for a detector of a medical detection device, the crystal array comprising:
a plurality of crystals arranged in an array, each of the crystals having
a light incident surface,
a light exit surface, and
a connection surface connecting the light incident surface to the light exit surface,
wherein the connection surface of at least one of two adjacent ones of the crystals comprises a rough surface and a smooth surface connected to the rough surface, and the rough surface and the smooth surface are arranged along a length direction of the crystal, and wherein an area of the rough surface is determined based on a size of the crystal and an action depth.

2. The crystal array of claim 1, wherein the two adjacent ones of the crystals are coupled with each other through air.

3. The crystal array of claim 1, wherein the smooth surface is connected to the light incident surface, and the rough surface is connected to the light exit surface.

4. The crystal array of claim 1, wherein the area of the rough surface is smaller than an area of the smooth surface.

5. The crystal array of claim 1, wherein the light incident surface and the light exit surface are smooth surfaces each, and are disposed in parallel to each other along a direction perpendicular to the length direction.

6. The crystal array of claim 1, wherein a material of the crystals is at least one of LYSO, LSO, BGO, NaI, LaBr3, GSO, LGSO or GACC.

7. The crystal array of claim 1, further comprising a reflective film, wherein the reflective film at least partially covers a periphery of the array formed by the crystals, and a material of the reflective film is at least one of PTFE, Teflon, MgO, TiO2, BaSo4 or ESR.

8. The crystal array of claim 1, wherein the area of the rough surface is determined based on a position of tailing in a position map of an entirely rough surface.

9. The crystal array of claim 1, wherein a length of the crystal is inversely proportional to a blocking capability of a material of the crystal.

10. The crystal array of claim 1, wherein light transmits differently at different action depths among different crystals of the crystal array.

11. The crystal array of claim 1, wherein the light incident surfaces, the light exit surfaces, and the connection surfaces of the two adjacent ones of the crystals are configured, such that position points of a corresponding position map expand outwards to ensure an air gap between the two adjacent ones of the crystals and to reduce a difference in transmission of photons at different action depths.

12. A detector, comprising:
a crystal array comprising a plurality of crystals arranged in an array, each of the crystals having a light incident surface, a light exit surface, and a connection surface connecting the light incident surface to the light exit surface, wherein the connection surface of at least one of two adjacent ones of the crystals comprises a rough surface and a smooth surface connected to the rough surface, and the rough surface and the smooth surface are arranged along a length direction of the crystal, and wherein an area of the rough surface is determined based on a size of the crystal and an action depth; and
a photodetector assembly comprising photodetectors, the photodetectors being arranged in an array and facing the respective light exit surfaces of the crystals.

13. The detector of claim 12, wherein the two adjacent ones of the crystals are coupled with each other through air.

14. The detector of claim 12, wherein the smooth surface is connected to the light incident surface, and the rough surface is connected to the light exit surface.

15. The detector of claim 12, wherein the area of the rough surface is smaller than the area of the smooth surface.

16. The detector of claim 12, wherein the light incident surface and the light exit surface are smooth surfaces each, and are disposed in parallel to each other along a direction perpendicular to the length direction.

17. The detector of claim 12, wherein a material of the crystals is at least one of LYSO, LSO, BGO, NaI, LaBr3, GSO, LGSO or GACC.

18. The detector of claim 12, wherein the crystal array further comprises a reflective film, wherein the reflective film at least partially covers a periphery of the array formed by the crystals, and a material of the reflective film is at least one of PTFE, Teflon, MgO, TiO2, BaSo4 or ESR.

19. The detector of claim 12, wherein the photodetector comprises at least one of a silicon photomultiplier or a photomultiplier tube.

20. A method of manufacturing a crystal array comprising a plurality of crystals, the method comprising:
processing outer surfaces of each of the plurality of crystals to form a light incident surface, a light exit surface, and a connection surface connecting the light incident surface to the light exit surface;
arranging the crystals in an array; and
disposing a reflective film on a periphery of the array and the light incident surfaces to form the crystal array,
wherein the connection surface of at least one of two adjacent ones of the crystals comprises a rough surface and a smooth surface connected to the rough surface, and the rough surface and the smooth surface are arranged along a length direction of the crystal, and wherein an area of the rough surface is determined based on a size of the crystal and an action depth.

* * * * *